United States Patent [19]
Shimmell et al.

[11] Patent Number: 5,411,311
[45] Date of Patent: May 2, 1995

[54] ATTACHMENT APPARATUS FOR AUTOMOTIVE STRUCTURE BRACE

[75] Inventors: Roger A. Shimmell, Plymouth; Donald L. Gibboney, Dearborn Heights; Roy S. Salisbury, Jr., all of Rochester, Mich.

[73] Assignee: Ford Motor Company, Dearborn, Mich.

[21] Appl. No.: 270,871

[22] Filed: Jul. 5, 1994

[51] Int. Cl.⁶ .............................................. B62D 25/08
[52] U.S. Cl. .................... 296/194; 296/192; 296/203; 296/30; 280/788
[58] Field of Search ............... 296/185, 187, 186, 188, 296/192, 194, 203, 29, 30; 280/689, 788, 693

[56] References Cited

U.S. PATENT DOCUMENTS 3,188,132 6/1965 Schwiering .................. 296/188 X
5,074,587 12/1991 Schwede et al. ................ 280/781

FOREIGN PATENT DOCUMENTS 63-82880 4/1988 Japan ...................................... 296/30

OTHER PUBLICATIONS

Mustangs & Fast Fords, Mar., 1994, p. 25, 107.
The Bodywork of the New Mercedes-Benz Convertible Respect to Ride Comfort and Ease of Operation, G. Huber, K. P. Claar, H. J. Scholz, Mercedes-Benz—905218.

Primary Examiner—Dennis H. Pedder
Attorney, Agent, or Firm—Gregory P. Brown; R. L. May

[57] ABSTRACT

A structural brace for a unibody chassis is disclosed for minimizing deflections of upper strut mounting points of a strut suspension. The strut brace includes attachments that efficiently transfers uniaxial, bending and torsional loads into the structural brace, thereby improving the control of the suspension geometry during vehicle cornering maneuvers.

16 Claims, 2 Drawing Sheets

ATTACHMENT APPARATUS FOR AUTOMOTIVE STRUCTURE BRACE

BACKGROUND OF THE INVENTION

1. Field of the Invention

This invention relates to structural braces for use in automobiles having unibody chassis. More particularly, the present invention relates to an efficient attachment apparatus for attaching a structural brace to the chassis of a motor vehicle to increase the chassis stiffening provided by the structural brace.

2. Disclosure Information

It is well known in the automotive chassis art to construct structural braces that triangulate the chassis structure to increase the strength of a chassis structure. Typical triangulating structural braces achieve their effectiveness by carrying uniaxial loading. Commonly, this is accomplished using a single removable fastener which effectively is nothing more than a pinned joint. It has been discovered, however, that if a structural brace can be designed to carry more than uniaxial loads for triangulating the strut towers of a unibody vehicle utilizing a strut type suspension, such as a MacPherson strut design, significant improvements in vehicle handling are realized.

It is therefore desirable to design an apparatus for attaching a structural brace to a strut tower of a unibody automotive vehicle that is capable of carrying torsional and bending loads in addition to uniaxial loads.

SUMMARY OF THE INVENTION

The present invention provides an automotive vehicle having a unibody chassis. The chassis includes a strut type suspension and strut towers from which the suspension depends. The chassis further includes a structural brace for triangulating the strut towers to one another and a cowl to improve vehicle maneuverability.

In the presently preferred embodiment, the automotive vehicle includes a unibody chassis and a strut type suspension depending therefrom. The automotive vehicle further comprises a cowl disposed between the front end and a passenger compartment, right and left rails extending longitudinally forward from respective right and left ends of the cowl, and right and left strut towers that depend downwardly from the respective rails. The strut towers are adapted to matingly engage upper ends of suspension struts, respectively. The automotive vehicle further includes steerable road wheels disposed at lower ends of the struts and a structural brace triangulating the strut towers to the cowl. The structural brace includes asymmetric attachments for attaching the structural brace to the strut towers. The asymmetric attachments are operative to transfer axial, torsional and bending loads into the structural brace from the strut towers, thereby increasing the efficiency of the structural brace in stabilizing the strut towers under vehicle cornering maneuvers.

Other objects, features and advantages of the present invention will become apparent to those skilled in the art from the drawings, detailed description and claims which follow.

DESCRIPTION OF THE PREFERRED EMBODIMENT

Figure 1:
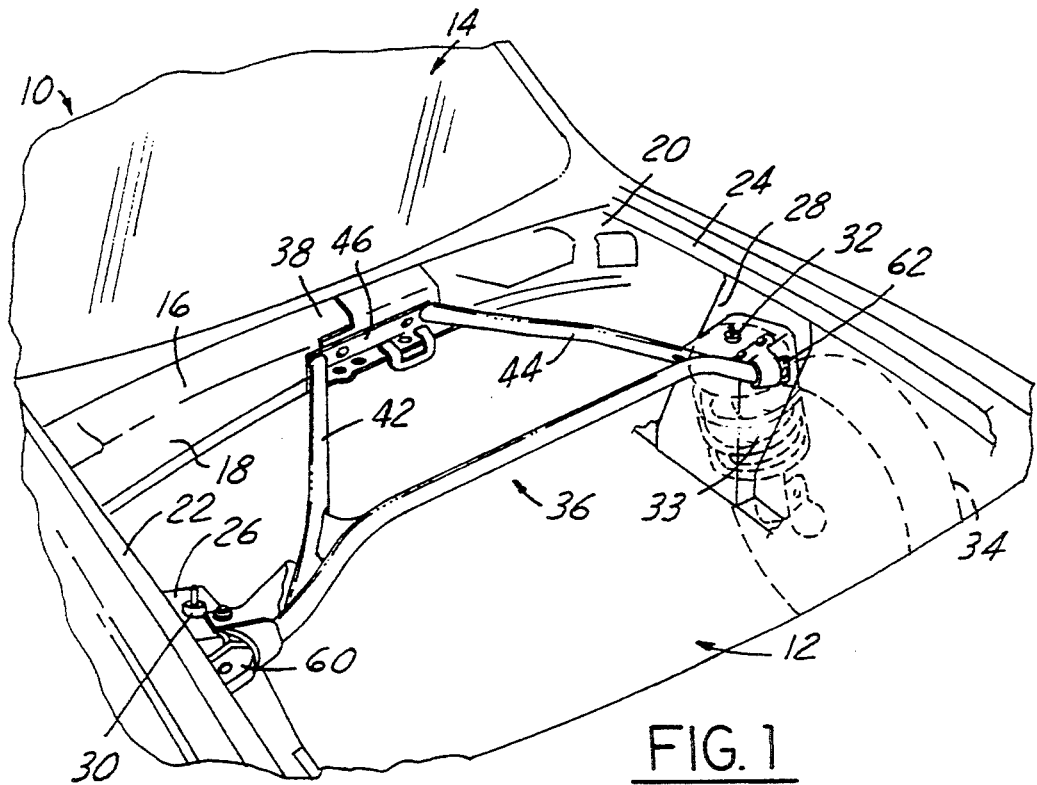
FIG. 1 is a partial perspective view of a motor vehicle illustrating a structural brace attached to the strut towers according to the present invention.

Referring now to FIG. 1, an automotive vehicle 10 having a front end 12 and passenger compartment 14 is constructed as a unibody chassis. The vehicle 10 also includes a cowl 16 disposed between the front end 12 and the passenger compartment 14 and extending the width of the car from a right end of the cowl 18 to the left end of the cowl 20. Right and left rails 22, 24 extend forward from right and left cowl ends 18, 20 to right and left strut towers 26, 28. The strut towers 26, 28 provide an attachment point for right and left upper ends 30, 32 of suspension struts 33 (right not shown). The struts are of a common design such as MacPherson struts, and they control the orientation of steerable road wheel 34 (right not shown) to the road, as well as provide vehicle damping. Therefore, the stability of the upper ends 30, 32 is directly related to the stability of the steerable road wheel 34 at the road.

Figure 2:
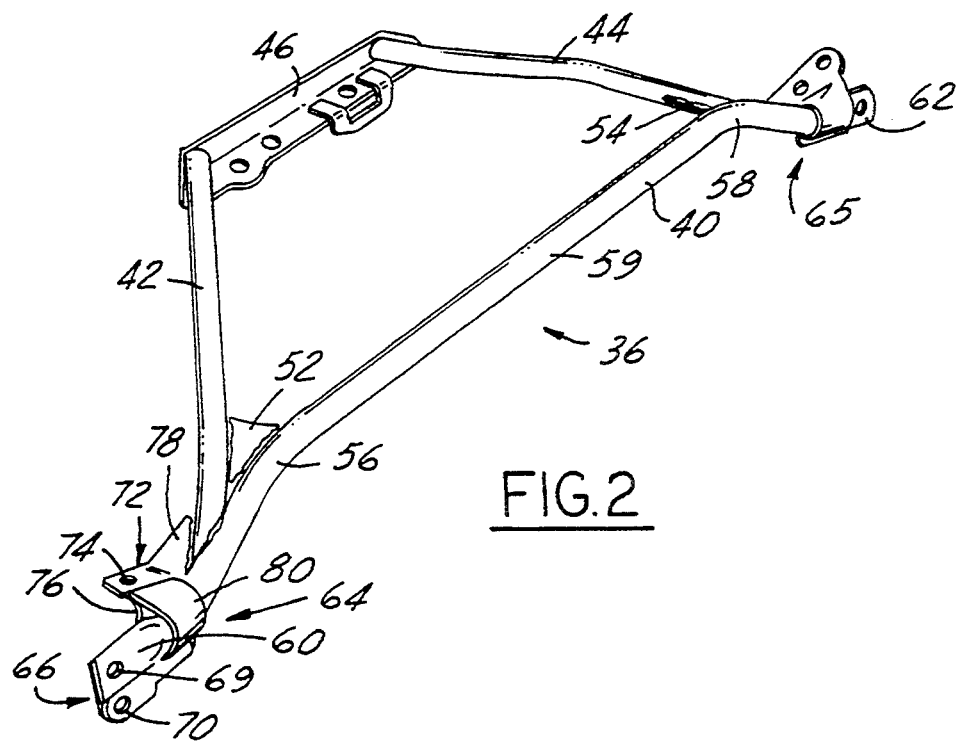
FIG. 2 is a perspective view of a structural brace including asymmetric attachments according to the present invention.

Referring now to FIGS. 1 and 2, a structural brace 36 is shown for triangulating the strut towers 30, 32 to the cowl midsection 38 of the cowl 16. The structural brace 36 includes a transverse member 40 having right and left ends 60, 62 adapted to attach to the strut towers 30, 32 and right and left members 42, 44 which extend rearward from the transverse member 40 to a cowl attachment bracket 46. The transverse member 40 and right and left members 42, 44 can be made from materials capable of bearing compressive, tensile, bending and torsional loads. Such materials include, but are not limited to, steel, aluminum, and high strength synthetic polymeric materials such as high strength polycarbonate.

Figure 3:
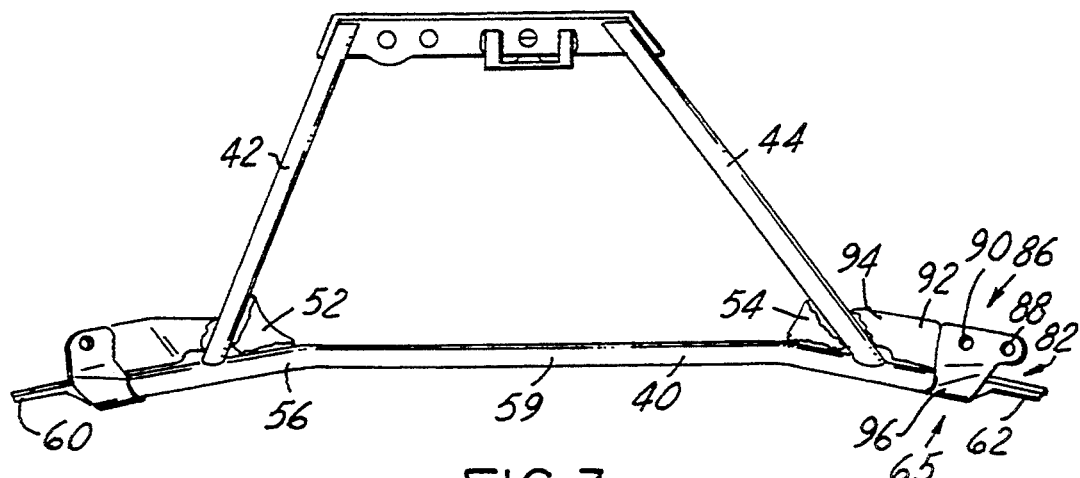
FIG. 3 is a plan view illustrating a structural brace including asymmetric attachments according to the present invention.

As shown in FIGS. 2 and 3, the right and left members 42, 44 attach to right and left ends 60, 62 of the transverse member 40 inboard from the strut towers 26, 28. The right and left 42, 44 form a substantially 45 degree interior angle to the transverse member 40 and may include right and left webs 52, 54 may be welded between the transverse member 40 and the right and left members 42, 44, respectively. The transverse member 40 also includes first and second bends 56, 58 disposed inboard of the right and left members 42 and 44 and a central portion 59 therebetween. This allows the central portion 59 of the transverse member 40 to be positioned rearward from the right and left ends 60, 62 of the transverse member 40. Together, this improved geometry substantially strengthens the transverse member in bending about the longitudinal and vertical axes, since the right and left members 42, 44 reduce the effective length of the transverse member 40 in reducing its deflection due to bending moments about the longitudinal and vertical axes.

Also shown in FIG. 2, the structural brace 36 includes right and left attachments 64, 65 for attaching the structural brace 36 to the strut towers 26, 28. The right attachment 64 includes a right vertical plate 66 having a first and second aperture 69, 70 therethrough and spaced vertically apart. The right attachment 64 also includes a right horizontal plate 72 having a third aperture 74 therethrough.

In the preferred embodiment, plates 66, 72 are partially formed by a first bridge member 76, having a first tab 78 welded to the right member 42. The first bridge member 76 extends from the first tab 78 to the right horizontal plate 72 and continues to the right vertical plate 66. To increase the strength of the plates 66, 72, a first doubler 80 may be included. The first doubler 80 may extend over the transverse member 40 to hold the transverse member 40 fast against the first bridge member 76 in the region between the vertical and horizontal plates 66, 72. The ends of the first doubler 80 may be welded to the plates 66, 72. The right vertical plate 66 further includes a flattened portion of the right end 60 of the transverse member 40.

Figure 5:
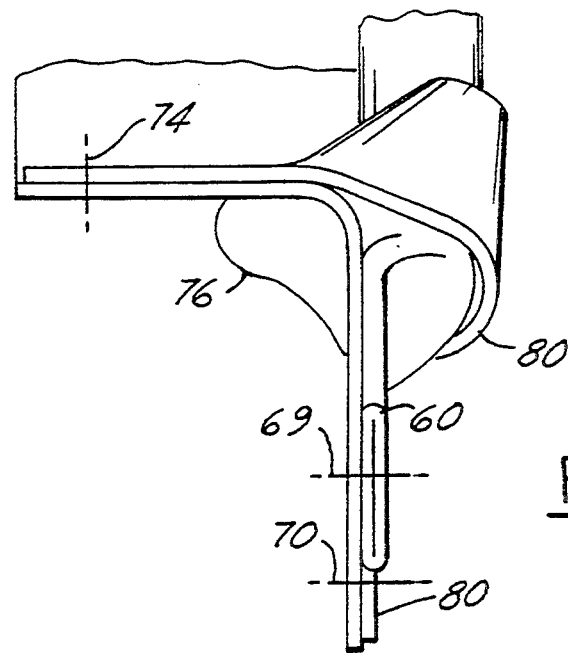
FIG. 5 is an end view taken from FIG. 4 illustrating right side vertical and horizontal asymmetric attachment plates according to the present invention.

FIG. 5 illustrates the stackup relationship of the first bridge 76, first doubler 80 and the flattened end 60 and the apertures there through for fastening the structural brace 36 to the strut tower 26. The first aperture 69 passes through the flattened end 60 of the transverse member 40 and the first bridge member 68. The second and third apertures 70, 74 pass through the first doubler 80 and the first bridge member 76.

Figure 4:
FIG. 4 is an elevational view illustrating a structural brace including asymmetric attachments according to the present invention.

Referring to FIGS. 3 and 4, the left attachment 65 includes a left vertical plate 82 having a fourth aperture 84 therethrough. The left attachment 65 also includes a left horizontal plate 86 having fifth and sixth apertures 88, 90 therethrough and horizontally spaced apart. The plates 82, 86 are partially formed by a second bridge member 92, having a second tab 94 welded to the left member 44. The second bridge member 92 extends from the second tab 94 to the left horizontal plate 86 and continues to the left vertical plate 82. To increase the strength of the horizontal and vertical plates 82, 86, a second doubler 96 may be included. The second doubler 96 extends over the transverse member 40 to hold the transverse member 40 fast against the bridge member 92 in the region between the plates 82, 86. The second doubler 96 may be welded to the plates 82, 86. The left vertical plate 66 also includes a flattened portion of the left end 62 of the transverse member 40. In this configuration the fourth aperture 84 passes through the flattened end 62 of the transverse member 40 and the second bridge member 92. The fifth and sixth apertures 88, 90 pass through the second doubler 96 and the second bridge member 68.

Referring to FIG. 1, the installation and operation of the structural brace will now be described. In the presently preferred embodiment, the structural brace 36 is fastened to the chassis using threaded fasteners 98 at all attachments to permit easy installation and removal for servicing components within the front end. Attachment to the strut towers 26, 28 is accomplished with six fasteners asymmetrically arranged to provide the added strength. More fasteners could be substituted, however, fewer would not adequately constrain the attachments 64, 65 in all degrees of motion.

The advantages of the present invention derive from the ability of the structural brace to resist relative displacement of the strut towers 26, 28. The unique orientation of the transverse member 40 to the right and left members 42, 44 combined with unique attachments provide this improvement. During cornering maneuvers, the suspension transfers lateral loads into the unibody chassis. These lateral loads create a torque on the unibody structure, which causes the unibody structure to deform slightly. Specifically, the strut towers 26, 28 and the upper ends 30, 32 of the struts engaged therein, tend to move relative to one another, changing the critical suspension geometry. Adding a structural brace reduces the amount of this deformation. The present invention significantly increases the improvements previously realized by simply secured triangulated structural braces. Resisting the deflection of the strut towers 26, 28 is accomplished by transferring uniaxial, bending and torsional loads through the structural brace 36.

Various other modifications and permutations of the present invention, no doubt, will occur to those skilled in the art. Therefore, it is the following claims, including all equivalents, which define the scope of the present invention.

What is claimed is:

1. An automotive vehicle having a unibody chassis and a strut type suspension depending therefrom, said automotive vehicle further comprising:
   a cowl disposed between a front end and a passenger compartment;
   right and left rails extending longitudinally forward from respective right and left ends of said cowl;
   right and left strut towers depending downwardly from said respective rails, said strut towers adapted to matingly engage upper ends of suspension struts, said suspension struts having steerable road wheels disposed at lower ends of said struts;
   a structural brace triangulating said strut towers to said cowl, said structural brace including multi-planar asymmetric attachments attaching said structural brace to said strut towers, said asymmetric attachments being operative to transfer axial, torsional and bending loads into said structural brace from said strut towers, thereby increasing the efficiency of said structural brace to minimize deflections in the strut towers during vehicle cornering maneuvers.

2. An automotive vehicle according to claim 1, wherein said asymmetric attachments further comprise:
   a right vertical plate adapted to be fastened to said right strut tower through a first and second aperture;
   a left vertical plate adapted to be fastened to said left strut tower through a third aperture;
   a right horizontal plate adapted to be fastened to said right strut tower through a fourth aperture; and
   a left horizontal plate adapted to be fastened to said left strut tower through a fifth and sixth aperture.

3. An automotive vehicle according to claim 1, wherein said asymmetric attachments further comprise:
   a right vertical plate including a first bridge member adjacent to said right strut tower, a right flattened end of a first transverse member adjacent to said first bridge member and a first doubler adjacent to said first bridge member;
   a first aperture passing through said right flattened end and said first bridge member of said right vertical plate member;
   a second aperture passing through said first doubler and said first bridge member, said first and second apertures being vertically spaced apart;
   a right horizontal plate including said first bridge member adjacent to said right strut tower and said first doubler adjacent to said first bridge member; and a third aperture passing through said first bridge member and said first doubler of said right horizontal plate.

4. An automotive vehicle according to claim 3, wherein said first bridge member extends from said third aperture and attaches to a right member adjacent to said transverse member.

5. An automotive vehicle according to claim 3, wherein said first doubler holds said transverse member fast against said first bridge member.

6. An automotive vehicle according to claim 1, wherein said asymmetric attachments further comprise:
 a left vertical plate including a second bridge member adjacent to said left strut tower, a left flattened end of a transverse member adjacent to said second bridge member;
 a fourth aperture passing through said left flattened end and said second bridge member of said left vertical plate;
 a left horizontal plate including said second bridge member adjacent to said left strut tower and a second doubler adjacent to said second bridge member;
 a fifth aperture passing through said second bridge member and said second doubler of said left horizontal plate; and
 a sixth aperture passing through said second doubler and said second bridge member of said left horizontal plate, said fifth and sixth apertures being horizontally spaced apart.

7. An automotive vehicle according to claim 6, wherein said second bridge member extends from said sixth aperture and attaches to a left member adjacent to said transverse member.

8. An automotive vehicle according to claim 6, wherein said second doubler holds said transverse member fast against said second bridge member.

9. An automotive vehicle according to claim 1, wherein said structural brace further comprises a right gusset disposed between a right member and a transverse member for reinforcement thereof, and a left gusset disposed between a left member and said transverse member for reinforcement thereof.

10. An automotive vehicle according to claim 1, wherein said structural brace further comprises a central portion of a transverse member disposed between right and left members, said central portion being disposed rearward of a vertical plane extending through a forwardmost portion of said asymmetric attachments.

11. A structural brace for an automotive vehicle of the type having a front end and a front pair of steerable road wheels located adjacent said front end, a cowl disposed between said front end and a passenger compartment, right and left rails extending longitudinally forward from respective right and left ends of the cowl, and right and left strut towers depending downwardly from right and left rails, said structural brace comprising:
 a transverse member to extend between the right and left strut towers and right and left members attached to said transverse member adjacent to said right and left strut towers, said right and left members extending rearward to attach to said cowl;
 multi-planar asymmetric right and left attachments disposed at right and left ends of said transverse member for attaching said structural brace to said right and left strut towers;
 whereby said right and left attachments transfer axial, torsional and bending loads into said structural brace from said strut towers, thereby increasing the efficiency of said structural brace to minimize deflections of the strut tower during vehicle cornering maneuvers.

12. A structural brace according to claim 11, wherein said right and left members extend rearward and toward each other in a convergent manner.

13. A structural brace according to claim 11, wherein said asymmetric attachments further comprise:
 a right vertical plate adapted to be fastened to said right strut tower through a first and second aperture;
 a left vertical plate adapted to be fastened to said left strut tower through a third aperture;
 a right horizontal plate adapted to be fastened to said right strut tower through a fourth aperture; and
 a left horizontal plate adapted to be fastened to said left strut tower through a fifth and sixth aperture by two fasteners.

14. A structural brace according to claim 13, wherein said first and second apertures are vertically spaced apart and said fifth and sixth apertures are horizontally spaced apart.

15. A structural brace according to claim 13, wherein said structural brace further comprises a right gusset disposed between said right member and said transverse member for reinforcement thereof, and a left gusset disposed between said left member and said transverse member for reinforcement thereof.

16. A structural brace according to claim 13 wherein said structural brace further comprises a central portion of said transverse member disposed between said right and left member, said central portion being disposed rearward of a vertical plane extending through a forwardmost portion of said asymmetric attachments.

* * * * *